(12) United States Patent
Günnewig et al.

(10) Patent No.: US 7,661,848 B2
(45) Date of Patent: Feb. 16, 2010

(54) INSTALLATION LIGHT

(75) Inventors: Frank Günnewig, Kastorf (DE); Ralf Göke, Lübeck (DE); Wolfgang Marquardt, Snohomish, WA (US); Christopher Follet, Lake Stevens, WA (US)

(73) Assignee: DAe Systems GmbH, Lübeck (DE)

( * ) Notice: Subject to any disclaimer, the term of this patent is extended or adjusted under 35 U.S.C. 154(b) by 167 days.

(21) Appl. No.: 11/871,400

(22) Filed: Oct. 12, 2007

(65) Prior Publication Data

US 2008/0089079 A1 Apr. 17, 2008

(30) Foreign Application Priority Data

Oct. 14, 2006 (DE) .................. 10 2006 048 711

(51) Int. Cl.
*F21V 7/00* (2006.01)
(52) U.S. Cl. .................. 362/277; 362/470; 362/241; 362/529
(58) Field of Classification Search .................. 362/529, 362/295, 276, 802, 394, 513, 470, 277
See application file for complete search history.

(56) References Cited

U.S. PATENT DOCUMENTS

| 6,234,651 | B1 * | 5/2001 | Kodama et al. ............. 362/276 |
| 6,664,489 | B2 * | 12/2003 | Kleinhans et al. ........... 200/313 |
| 7,072,533 | B1 * | 7/2006 | Krier ............................ 385/13 |
| 7,172,313 | B2 * | 2/2007 | Abel et al. .................. 362/205 |
| 7,361,860 | B2 * | 4/2008 | Caldwell .................... 200/600 |
| 7,446,429 | B2 * | 11/2008 | Togura et al. .............. 307/10.8 |
| 2001/0032655 | A1 * | 10/2001 | Gindi ......................... 132/293 |
| 2002/0145871 | A1 | 10/2002 | Yoda |

* cited by examiner

*Primary Examiner*—Ali Alavi
(74) *Attorney, Agent, or Firm*—McGlew and Tuttle, P.C.

(57) ABSTRACT

An installation light for a vehicle or aircraft comprises a multitude of lighting elements. These lighting elements may be activated individually or in groups, in a manner such that the radiation direction and/or emittance angle of the light emitted by the installation light may be adjusted.

19 Claims, 1 Drawing Sheet

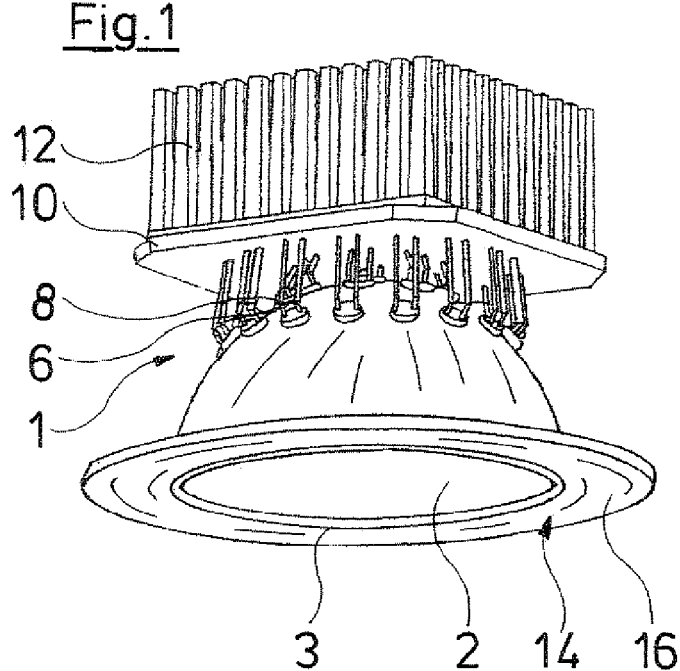
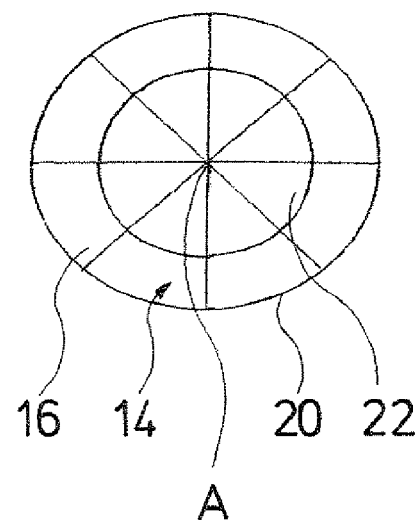
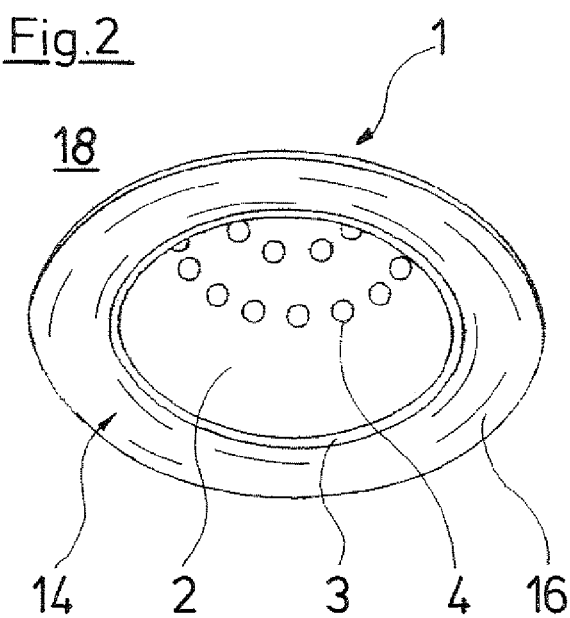
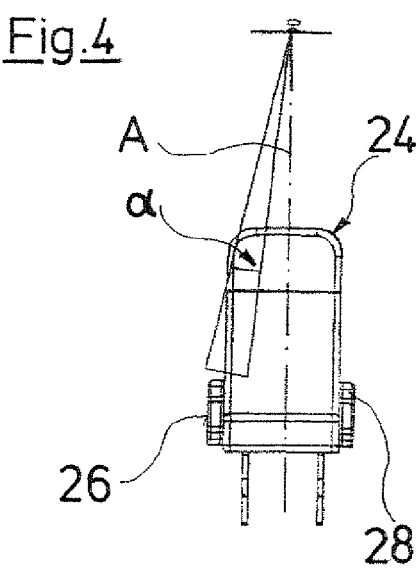

INSTALLATION LIGHT

CROSS REFERENCE TO RELATED APPLICATIONS

This application claims the benefit of priority under 35 U.S.C. § 119 of German Patent Application DE 10 2006 048 711.7 filed Oct. 14, 2006, the entire contents of which are incorporated herein by reference.

FIELD OF THE INVENTION

The present invention relates to an installation light and more particularly relates to a vehicle installation light or aircraft installation light with a multitude of lighting elements, which individually or in groups, may be activated in a manner such that the beam direction and/or the emittance angle ($\alpha$) of the light emitted by the installation light may be adjusted.

BACKGROUND OF THE INVENTION

It is usual to provide installation lights in passenger cabins of aircraft, buses, trains and likewise, above the passenger seats, these installation lights in each case being assigned to a seat. These installation lights, as a rule, are designed such that their emittance angle, i.e. the spatial angle of the light emitted by the installation light, is quite confined. In this manner, the neighboring passengers are not excessively disturbed by the emitted light of the installation light, but the passenger location itself in contrast is well illuminated, in particular is adequately illuminated for reading.

Installation lights of this type, which have been known until now, comprise a lighting means receiver, with lighting means arranged therein, typically an incandescent lamp. In order to be able to align the light spot produced by the lighting means, onto an object such as a book or newspaper in a targeted manner, the lighting means receiver is usually arranged in a rotatable or pivotable manner about a horizontal axis as well as a vertical axis, in a suitably designed holder. Such an installation light is described in US 2002/0145871 A1, with which however several lighting means are arranged in a lighting means receiver.

The movable components which are required for this, render the installation lights heavy, prone to wear and expensive in maintenance. Apart from this, it has been found that these installation lights are difficult to operate by passengers with limited tactile capabilities.

DE 102 51 133 B3 describes a lighting device for the interior of a motor vehicle, with several light sources, wherein the emittance power and the emittance direction of the lighting device may be controlled in a touch-free manner by way of signals detected by a proximity sensor. The application of such an illumination device in passenger cabins of aircraft, buses and trains, with which the lighting devices are arranged above the seat locations, tends to be rather disadvantageous, since there it is possible to leave the seating locations and this, with the movements of the passengers which this entails, may change the emittance characteristics of these illumination devices in an unintended manner.

A lighting device with light sources emitting weak light for the incident light illumination of regions of the vehicle interior is known from DE 10 2004 039 284 A1, with which the light sources are connected to a control unit and may be individually switched on and off with this. The goal of the lighting device known from D2 is to provide diffuse light which is spread as widely as possible, in order not to dazzle the driver of the vehicle. Inasmuch as this is concerned, the lighting devices described in DE 10 2004 039 284 A1 also tend to be rather unsuitable for the application as a reading light in passenger cabins of aircraft, buses and trains.

SUMMARY OF THE INVENTION

Against this background, it is the object of the invention to provide an installation light which is low in wear and maintenance, which is simple to operate and meets today's high standards of design appearance.

The installation light according to the invention is provided for an aircraft or vehicle, such as e.g. for a bus or train, where it may be installed into a wall and preferably into a ceiling above a seat, for example in the roof of the vehicle, or in a personal service unit. The installation light comprises a multitude of lighting means which are arranged within a reflector. These lighting means may be activated individually or in groups, in a manner such that the beam direction and/or the emittance angle of the light emitted by the installation light may be adjusted. According to the invention, a touch sensor field for activating the lighting means is arranged around the reflector in an annular manner.

The lighting means which preferably emit white light or at least approximately white light, in the illumination light according to the invention, are arranged in a stationary manner in at least one so-called "array" and in a cluster-like manner with such a small distance to one another, that the emittance angles of adjacent lighting means overlap one another in a manner such that the light emitted from these lighting means produces a homogeneously appearing light flux. Furthermore, the individual lighting means are preferably in each case aligned obliquely to one another, in a manner such that the beam direction of adjacent lighting means only differs insignificantly, wherein the beam direction of lighting means which are arranged one behind the other in any common direction in the installation light, continuously changes with an increasing distance.

In this manner, with the installation light according to the invention, it is possible by way of a suitable activation of individual or adjacent lighting means, to change the beam direction, i.e. the direction of the light flux emitted by the installation light, in a fixed range. Thereby, the total emittance angle of the installation light, which is determined by the emittance angles of the lighting means which are individually activated to illuminate, and thus the surface region which is illuminated by the installation light which this entails, may be changed by way of the number of adjacent lighting means activated to illuminate. Thus, the light flux which is emitted from the installation light according to the invention, may be adjusted within wide limits, wherein no moving components which are prone to wear are required for aligning the light flux, i.e. for adjusting the illumination direction.

The touch sensor field forms a ring around the open end-edge of the reflector, wherein the outer side of the touch sensor field is preferably aligned with a translucent cover of the reflector, so that the installation light according to the invention forms a plane surface at its outer sides which face the user, which advantageously permits an installation into a wall or ceiling in a manner which is flush with the surface, and thus permits a modern design appearance.

On account of their small size, light emitting diodes and/or laser diodes are preferably provided as lighting means. Thereby, apart from the low weight and electricity requirement, the life duration of the light emitting diodes which is significantly greater compared to incandescent bulbs, has also been found to be advantageous, wherein the latter characteristic of the light emitting diodes considerably reduces the required maintenance effort compared to conventional installation lights of this type. In one advantageous design, the installation light according to the invention may comprise light emitting diodes as well as laser diodes as lighting means, wherein for example the laser diodes are arranged in a central region of the installation light and are surrounded by light emitting diodes. With this, with the use of the installation light as a reading light, e.g. it is purely the laser diodes which are activated to emit light, and a tightly focused light flux is emitted onto a book or a newspaper, whereas the light emitting diodes, as the case may be, together with the laser diodes, are activated in a light-emitting manner for illuminating the complete passenger location.

Usefully, the illumination intensity may also be changed with the installation light according to the invention. Here, the illumination intensity or the brightness of the light flux emitted by the installation light may be adjusted or changed on the one hand via the number of adjacent lighting means activated to illuminate, as well as by way of the applied voltage. Preferably, the installation light for this has a power control, with which the illumination intensity of the individual lighting means may be changed in an infinite manner.

The lighting means are arranged in a reflector for an improved leading of the light emitted by the individual lighting means and for increasing the usable light yield. Thereby, just as is the case with the lighting means, the reflector is also arranged in the installation light according to the invention in a stationary manner. The reflector in a suitable manner comprises a reflecting, preferably mirrored surface. The surface characteristics of the reflector however, just as its geometric design, are adapted to the application purpose, depending on whether the light of the installation light with this reflector is to be scattered in a certain region or is to be directed.

In one particularly advantageous design, the reflector is curved in a concave manner, and is preferably designed curved in a spherically concave manner. Thus, the reflector may have the shape of a hollow hemisphere, on whose inner superficies surface, the lighting means are arranged in a uniformly distributed manner. With this design, the emittance direction in each case of adjacent lighting means continuously changes, by way of aligning preferably all lighting means normally to the hemispherical reflector surface and thus by way of them beaming in each case in a different radial direction of the reflector.

The open end-side of such a concavely curved reflector is usefully closed by a cover of a translucent material. This cover may also be designed as a lens with light-scattering or focusing properties. The outer side of this cover is preferably designed in a planar manner.

The region of the inner superficies surface of the reflector, in which the lighting means are arranged, may be limited within the reflector. Thus the lighting means within the reflector may merely be arranged in the region of a spherical cap lying opposite the open end-side of the reflector, in a manner such that the light beams of all lighting means are directed to the outside through the open end-side of the reflector into the open. In order for the passengers of an adjacent seat of a user of the installation light not to be disturbed by light, the region of the spherical cap in which the lighting means are arranged, is advantageously selected so small, that the light emitted by the installation light, may only be directed onto the seat of the user of the installation light concerned, and not beyond this.

Advantageously, in each case one reflector may be assigned to each lighting means also. Thus for example, a multitude of recesses concavely curved in a calotte-like manner may be provided on a concavely curved reflection surface of a reflector, wherein preferably in each case one lighting means is arranged in each of these recesses, and each of these recesses forms a separate reflector for the lighting means arranged therein.

A touch sensor field is advantageously provided for activating the lighting means. The installation light with touch sensor field provides advantages compared to the installation lights known until now, as these no longer need to be grasped for adjustment, but instead of this, with the installation light according to the invention, merely a slight touching of the touch sensor field is required for this, so that the installation light may also be operated in a simple manner by persons having less tactile capabilities.

The touch sensor field is preferably divided up into sectors, wherein one or more lighting means are assigned to each sector and may be activated via this sector. The assignment of these sectors to one or more lighting means may for example be rendered recognizable by way of a symbolic or colored marking.

The touch sensor field is advantageously designed around the reflector in an annular manner. Thus the touch sensor field usefully forms a ring around the open end-edge of the reflector, wherein the outer side of the touch sensor field is preferably aligned to a translucent cover of the reflector, so that the installation light according to the invention forms a plane surface at its outer sides facing the user, which advantageously permits an installation into a wall or ceiling, flush with the surface, and thus a modern design which this entails.

The annularly designed touch sensor field is divided into radial sections for the simple directing of the light beam, wherein the radial alignment of these radial sections corresponds essentially to the radial emittance direction of the light beam or of the light beams of the lighting means activated by this radial section. With the help of this design, it is simple for the user of the installation light according to the invention, to align the light beam in the manner which is desired by the user.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 1 is a perspective view of the installation light according to the invention;

FIG. 2 is a perspective view of the installation light according to FIG. 1, in the assembled condition;

FIG. 3 is a basic sketch of an annularly designed touch sensor field with a division into radial sections; and FIG. 4 is a schematic view of the arrangement of the installation light above a vehicle seat.

DESCRIPTION OF THE PREFERRED EMBODIMENT

Referring to the drawings in particular FIGS. 1 and 2 show a vehicle installation light and aircraft installation light 1 with a reflector 2 curved in a spherically concave manner, in the shape of a hemispherical shell. A circular cover disk 3 of a transparent, i.e. light-permeable material is arranged on the end-side of this hemispherical shell, and this disk closes the inner space of the reflector 2.

A multitude of light emitting diodes 4, which form the lighting means of the installation light 1, is arranged in the region of the spherical cap of the hemispherical shell, in the reflector 2. Adjacent light emitting diodes 4 here in each case have the same distance to one another. The alignment of the light emitting diodes 4 is such that the main emittance direction of the light emitting diodes corresponds essentially to the radius of curvature of the reflector 2 at the location of its arrangement on the reflector 2. In this manner, each light emitting diode 4 has an emittance direction which differs from the emittance directions of all remaining light emitting diodes 4. The individual light emitting diodes 4 are led through the wall of the reflector 2 and are fastened on the reflector 2 in a manner such that the light-emitting semiconductor crystals of the light emitting diodes 4 project into the spherically curved inner space of the reflector 2, whilst the anodes 6 and the cathodes 8 of the light emitting diodes project outwards, at the outer side of the reflector 2.

A circuit board 10 is arranged on the outer side of the spherical cap of the reflector 2. The anodes 6 as well as the cathodes 8 of all light emitting diodes 4 are connected to this circuit board 10 by way of wire bonding. The circuit board 10 carries the control and power electronics of the installation light 1, and serves for activating the light emitting diodes 4. A heat exchanger 12 is arranged on the circuit board 10 on the side which is distant to the reflector 2, for leading away the heat arising on the circuit board 10.

The end-side of the reflector 2 is surrounded by an annularly designed sensor device 14, in a manner such that the sensor device 14 projects radially outwards on the outer side of the reflector 2. With this, the end-side of the sensor device 14 which is distant to the light emitting diodes 4 is aligned to the end-side of the cover disk 3 which is likewise distant to the light emitting diodes 4. The end side of the sensor device 14 which is distant to the light emitting diodes 4 is designed as a touch sensor field 16 with a surface which is sensitive to touch, for example a touchpad. With this touch sensor field 16, by way of touching it, the light emitting diodes 4 may be activated individually or in groups. For this, the sensor device 14 is likewise connected in a conductive manner to the circuit board 10 of a control/power control, in a manner which is not represented.

FIG. 2 shows the installation light 1 according to the invention, installed into a ceiling 18. Thereby, the reflector 2 with the circuit board 10 arranged therein engages almost completely into an opening provided in the ceiling 18, so that only the sensor device 14 with its outer regions bears on the ceiling 18. The installation light 1 on account of a flat, disk-like design of the sensor device 14, is integrated in the ceiling 18 almost flush with the surface, and in this manner advantageously fulfils the usual current design appearance of today.

One may deduce from the basic sketch represented in FIG. 3, that the touch sensor field 16 of the sensor device 14 is divided into eight radial sections 20, and the inner sphere of the reflector 2 is likewise divided into eight radial sections 22. A certain number of the light emitting diodes 4 arranged in the reflector 2 are assigned to each of the radial sections 20 of the touch sensor field 16, and these diodes may be activated by way of touching the respective radial section 20 of the touch sensor field 16. With this, one envisages the light emitting diodes 4 which in each case are arranged in the radial section 22 of the reflector 2, being able to be activated by a radial section 20 of the touch sensor field 16, wherein this section, with a mirroring at a middle axis A of the reflector 2, is directly adjacent the radial section 20 of the touch sensor field 16, which lies opposite the radial section 20 concerned, of the touch sensor field 16. In this manner, with the installation light 1 according to the invention, the radial emittance direction of the light emitting diodes 4 activated by a radial section 20 corresponds essentially to the radial alignment of the related radial section 20 of the touch sensor field 16.

A vehicle seat 24 is represented in FIG. 4, above which an installation light 1 is arranged in a ceiling 18. The power control with circuit board 10 is connected to the installation light 1 whereby the illumination intensity of the individual lighting elements (individual lighting means) may each be selectively changed in an infinite manner. The installation light 1 is activated such that a certain number of light emitting diodes 4 of the installation light 1 emit light onto an arm rest 26 arranged at the left in FIG. 4, in a spot-like manner. The emittance angle $\alpha$ of the light emitted by these light emitting diodes 4 is about 10°. This emittance angle $\alpha$ is not fixed to 10°, but may also be increased or reduced in size via the number of the light emitting diodes 4 activated by the control 30 to illuminate the light emitting diodes. The light emitted by the installation light 1 may also be emitted in other emittance directions by way of activating the respective light emitting diodes 4 via the radial sections 20 of the touch sensor field 16 which are allocated to these light emitting diodes 4. Thus the light may for example be directed onto the arm rest 28 of the vehicle seat 24, which is shown on the right in FIG. 4. As a whole, the emittance direction of the light may be adjusted in a spatial angle range of about 30° with the installation light 1 according to the invention.

While a specific embodiment of the invention has been shown and described in detail to illustrate the application of the principles of the invention, it will be understood that the invention may be embodied otherwise without departing from such principles.

APPENDIX

List of Reference Numerals

1 installation light
2 reflector
3 cover disk
4 light emitting diode
6 anode
8 cathode
10 circuit board
12 heat exchanger
14 sensor device
16 touch sensor device
18 cover
20 angle section
22 angle section
24 vehicle seat
26 arm rest
28 arm rest
A middle axis
$\alpha$ emittance angle

What is claimed is:

1. An installation light for a vehicle or aircraft, the installation light comprising:
   a reflector;
   a multitude of lighting means, which individually or in groups, are activated in a manner such that the beam direction and/or the emittance angle ($\alpha$) of the light emitted by the installation light is adjusted, said lighting means being arranged within said reflector;
   a touch sensor field for activating said lighting means, said touch sensor being formed around said reflector in an annular manner.

2. An installation light according to claim 1, wherein said multitude of lighting means includes means to change the illumination intensity thereof.

3. An installation light according to claim 1, wherein said lighting means comprises at least one of light emitting diodes and laser diodes.

4. An installation light according to claim 1, wherein said reflector is curved with a concave shape.

5. An installation light according to claim 4, wherein said concave shape includes a concave spherical curved portion.

6. An installation light according to claim 1, wherein said reflector is allocated with a lighting means.

7. An installation light according to claim 1, wherein said touch sensor field is divided into sectors, wherein one or more lighting means are allocated to each sector, said one or more lighting means being activated via an associated said sector.

8. An installation light according to claim 1, wherein said touch sensor field comprises radial sections, each radial section having a radial alignment corresponding essentially to a radial component of the light beam or the light beams of the lighting means, wherein each radial section activates an associated radial component of the light beam or the light beams of the lighting means.

9. An installation light according to claim 1, further comprising a power control with an infinite adjustment range for adjusting the illumination intensity of the individual lighting means.

10. A vehicle or aircraft installation light comprising:
a reflector;
a plurality of lighting elements, each lighting element being arranged relative to said reflector;
a touch sensor field formed around said reflector in an annular manner;
control means for controlling activation of said lighting elements for activating said lighting elements individually or in groups to provide an output beam direction and/or the emittance angle ($\alpha$) of the light emitted by the installation light that may be adjusted, said touch sensor field cooperating with said control means for selectively activating said lighting elements.

11. An installation light according to claim 10, wherein said control means selectively changes an illumination intensity of said lighting elements individually or in groups.

12. An installation light according to claim 10, wherein some of said lighting elements comprise one of light emitting diodes and laser diodes.

13. An installation light according to claim 10, wherein said reflector is curved with a partially spherical concave shape.

14. An installation light according to claim 10, wherein said touch sensor field is divided into sectors, wherein one or more lighting elements are allocated to each sector, said one or more lighting elements being activated via an associated said sector.

15. An installation light according to claim 10, wherein said touch sensor field comprises radial sections, each radial section having a radial alignment corresponding essentially to a radial component of the light beam or the light beams of the lighting elements, wherein each radial section activates an associated radial component of the light beam or the light beams of the lighting elements.

16. An installation light according to claim 10, wherein said control means provides an infinite adjustment range for adjusting the illumination intensity of the individual lighting elements.

17. An installation light arrangement for a vehicle or aircraft, the installation light arrangement comprising:
a vehicle seat;
a reflector disposed above said vehicle seat;
a multitude of lighting means, which individually or in groups, are activated in a manner such that the beam direction and/or the emittance angle ($\alpha$) of the light emitted by the installation light relative to the vehicle seat is adjusted, said lighting means being arranged within said reflector;
a touch sensor field for activating said lighting means, said touch sensor field being formed around said reflector in an annular manner.

18. An installation light arrangement according to claim 17, wherein said lighting means comprises at least one of light emitting diodes and laser diodes.

19. An installation light arrangement according to claim 17, wherein said touch sensor field comprises radial sections, each radial section having a radial alignment corresponding essentially to a radial component of the light beam or the light beams of the lighting elements, wherein each radial section activates an associated radial component of the light beam or the light beams of the lighting elements.

* * * * *